(12) United States Patent
Graham (10) Patent No.: US 6,196,766 B1
(45) Date of Patent: *Mar. 6, 2001

(54) APPARATUS FOR MOVEMENT ALONG AN UNDERGROUND PASSAGE AND METHOD USING SAME

(76) Inventor: Neil Deryck Bray Graham, 18 Castelon Crescent, Cockburn Waters, Western Australia (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/420,051

(22) Filed: Oct. 18, 1999

Related U.S. Application Data (63) Continuation of application No. 08/809,852, filed as application No. PCT/AU95/00667 on Oct. 6, 1995, now Pat. No. 5,971,667.

(30) Foreign Application Priority Data

Oct. 7, 1994 (AU) .................................................. PN8650

(51) Int. Cl.[7] .................................. F16L 1/00; E02F 5/10; E03F 3/06
(52) U.S. Cl. .......................... 405/184; 175/53; 405/154; 405/155
(58) Field of Search ..................................... 405/184, 154, 405/155, 138, 146, 134–137, 174–176; 175/53, 61, 62, 73

(56) References Cited

U.S. PATENT DOCUMENTS

| | | |
|---|---|---|
| 3,120,107 | 2/1964 | Juusela et al. . |
| 3,422,631 | 1/1969 | Silverman . |
| 3,546,890 | 12/1970 | Ede . |
| 3,812,884 | 5/1974 | Breitfuss . |
| 4,057,115 | 11/1977 | Girault . |
| 4,191,493 | 3/1980 | Hansson et al. . |
| 4,850,440 | 7/1989 | Smet . |
| 4,915,541 | 4/1990 | Thompson et al. . |
| 5,076,729 | 12/1991 | Grotenhofer . |
| 5,129,761 | 7/1992 | Andersen et al. . |
| 5,169,264 | 12/1992 | Kimura . |
| 5,187,843 | 2/1993 | Lynch . |
| 5,293,672 | 3/1994 | Tominaga et al. . |

FOREIGN PATENT DOCUMENTS

| | | |
|---|---|---|
| 27521/77 | 2/1979 | (AU) . |
| 536027 | 4/1984 | (AU) . |
| 569579 | 12/1987 | (AU) . |
| 40 37074 A1 | 5/1992 | (DE) . |
| 0305834 | 3/1989 | (EP) . |
| 2624 199 A1 | 6/1989 | (FR) . |
| 1370244 | 10/1974 | (GB) . |
| 2 252 581 | 8/1992 | (GB) . |
| 4-330199 | 11/1992 | (JP) . |
| 6-17599 | 1/1994 | (JP) . |
| 6-240996 | 8/1994 | (JP) . |
| 75/06591 | 6/1975 | (NL) . |
| 794116 | 1/1981 | (SU) . |
| 802466 | 2/1981 | (SU) . |
| 1366606 A1 | 1/1988 | (SU) . |

*Primary Examiner*—Dennis L. Taylor
(74) *Attorney, Agent, or Firm*—Hogan & Hartson LLP (57) ABSTRACT

An apparatus adapted for movement through a passage formed in the ground includes an elongate element and means for positioning a shroud around at least part of the elongate element for engagement against the periphery of the passage to provide a space through which the elongate element can move. The shroud is of flexible construction and is arranged to be progressively installed in position as the elongate element moves along the passage. The apparatus is adapted for introducing an inflation fluid into the region between the shroud and the elongate element in order to inflate the shroud and maintain it in engagement against the periphery of the passage.

10 Claims, 11 Drawing Sheets

APPARATUS FOR MOVEMENT ALONG AN UNDERGROUND PASSAGE AND METHOD USING SAME

The present application is a continuation of U.S. patent application Ser. No. 08/809,852 filed Apr. 3, 1997, now U.S. Pat. No. 5,971,667, which issued Oct. 26, 1999, under 35 U.S.C. § of PCT/AU95/00667, filed Oct. 6, 1995, with priority from Australia Application No. PN 8650 filed Oct. 7, 1994, priority under 35 U.S.C. §§ 120 and 371 therefrom is hereby claimed.

FIELD OF THE INVENTION

This invention relates to apparatus for movement along an underground passage and to a method of moving an apparatus along an underground passage.

DISCUSSION OF THE PRIOR ART

The invention has been devised particularly, although not exclusively for use in an underground mining operation which utilises a mining head positioned at one end of an elongate element, such as a pipe string, whereby the mining head can be manoeuvred to, and through, an underground formation by movement of the elongate element. The mining head creates a passage along which the elongate element passes. A difficulty with this arrangement is that in situations where the passage is formed in soft sandy deposits and the like, material surrounding the passage can collapse around the pipe string with the result that the pipe string can become jammed in the ground.

Traditionally, underground mining operations of the type described above do not allow hard wiring of the mining head and rely on other means or control and operation of motors and telemetry. For example, "mud" motors running on pressurised bentonite fluid and the use of "mud" pulsing for telemetry purposes has limited the drilling capacity of this form of underground mining. If the mining head were able to be hard wired drilling capacity could be increased by the use of electro/hydraulic power and through direct control of the mining head by the use of telemetry cabling.

It would be advantageous to provide a shroud around the pipe string for lining the passage so as to prevent surrounding material from collapsing onto the pipe string. The apparatus and method of the present invention have as one object thereof to overcome the above-mentioned problems.

BRIEF DESCRIPTION OF THE INVENTION

The present invention provides an apparatus adapted for movement through a passage formed in the ground, characterised by an elongate element and means for positioning a shroud around at least part of the longitudinal periphery of the elongate element for supporting engagement with the periphery of the passage to provide a space through which the elongate element can move, the shroud being of flexible construction and being arranged to be progressively installed in position as the elongate element moves along the passage, and means for introducing an inflation fluid into the region between the shroud and the elongate element for inflating the shroud and maintaining it in supporting engagement with the periphery of the passage, wherein the shroud is delivered to the elongate element from a remote storage point for installation.

The shroud may be assembled from flexible material which turns around a location on the elongate element to provide an inner section which is conveyed with the elongate element and an outer section which is turned back with respect to the inner section and which provides the shroud, the outer section being fixed in relation to the passage whereby the flexible material turns around from the inner section to the outer section to provide the shroud as the elongate element moves along the passage.

The flexible material may comprise two or more elongate sections arranged such that the longitudinal sides thereof are joined one to another at the outer section to provide the shroud.

The longitudinal sections may have complimentary connector elements on their longitudinal sides for joining the longitudinal edges thereof together.

The flexible material may be turned around from the inner section to the outer section at turning means such as rollers moving with the elongate element. Conveniently, the rollers are mounted on the elongate element. The rollers may be accommodated within a protective casing positioned around a leading end of the elongate element.

The inner section of the flexible material may be accommodated in one or more longitudinal passages provided on the outer periphery of the elongate element.

In circumstances where the elongate element is required to be particularly long it is preferable that driving means be provided in or adjacent to the longitudinal passages thereby facilitating the travel of the inner section of flexible material. Still preferably, the driving means may be provided so as to specifically engage and facilitate the travel of the connector elements of the inner section of flexible material thereby facilitating the travel of the flexible material itself.

A seal may be provided between a fixed end of the outer section of the flexible material and the elongate element to define the outermost end of the shroud, the seal permitting sliding movement of the elongate element therethrough as it moves within the passage.

A further seal may be provided between the outer section of the flexible material and the elongate element to define an innermost end of the shroud.

The flexible material may be stored in roll form and unwound from the roll and progressively delivered to the elongate element as it advances through the passage to provide the inner section and thereby allows deployment of the shroud over long distances. The rolls of flexible material may be stored at ground level.

The inflation fluid may comprise a slurry such as Betonite slurry.

The present invention further provides an elongate structure adapted to be moved axially through an underground passage, comprising an elongate element and means for positioning a shroud around at least part of the longitudinal periphery of the elongate element as it advances through the passage for engagement against the periphery of the passage to provide a space through which the elongate element can move, the shroud being assembled from flexible material which is delivered from a remote storage point and turns around a location moving with the elongate element to provide an inner section which is conveyed with the elongate element and an outer section which is turned back with respect to the inner section to provide the shroud, wherein the outer section is fixed in relation to the passage, there being further provided means for introducing as inflation fluid into the region between the shroud and the elongate element.

Preferably, the outer section of the flexible material defines an inner region and an inflation fluid is delivered into the inner region to urge the outer section into supporting engagement with the periphery of the passage.

The present invention still further provides a connector means for use in the releasable hermetic fixing together of elongate sections of flexible material of which is comprised a shroud, the connector means comprising first and second connector elements of complimentary configuration whereby such may be pressed together and force applied to pull such apart acts to strengthen the grip therebetween, the connector elements requiring an unpeeling or unzipping action to separate same.

Each connector is preferably elongate and extends along one longitudinal side of an elongate section of flexible material. The first connector element may be provided in a male configuration with the second connector element provided in a complimentary female configuration.

The first and second connector elements further have complimentary longitudinal ridges and recesses provided thereon and arranged such that force applied to pull same apart acts to strengthen the grip of the second connector element about the first connector element.

The present invention also provides a method for facilitating movement of apparatus underground, characterised by the deployment and positioning of a shroud about at least a part of a longitudinal periphery of that apparatus as it advances through a passage created thereby for supporting engagement with the periphery of the passage, the shroud being assembled from a flexible material delivered to the apparatus from a remote storage point, an inflation fluid fluid being introduced into the region between the shroud and the apparatus for inflating the shroud and maintaining it in supporting engagement with the periphery of the passage.

The flexible material of the shroud is characterised in that the flexible material of the shroud is turned around a location moving with the apparatus to provide an inner section which is conveyed with the elongate element and an outer section which is turned back with respect to the inner section to provide the shroud, the outer section being fixed in relation to the passage.

DESCRIPTION OF THE DRAWINGS

The invention will be better understood by reference to the following description of one specific embodiment thereof as shown in the accompanying drawings in which.

DESCRIPTION

The embodiments are directed to apparatus for use in an underground mining operation for recovering materials from underground formations which are normally extremely difficult to access, such as deep leads covered by an overburden of mud, sand and basalt.

Figure 1:
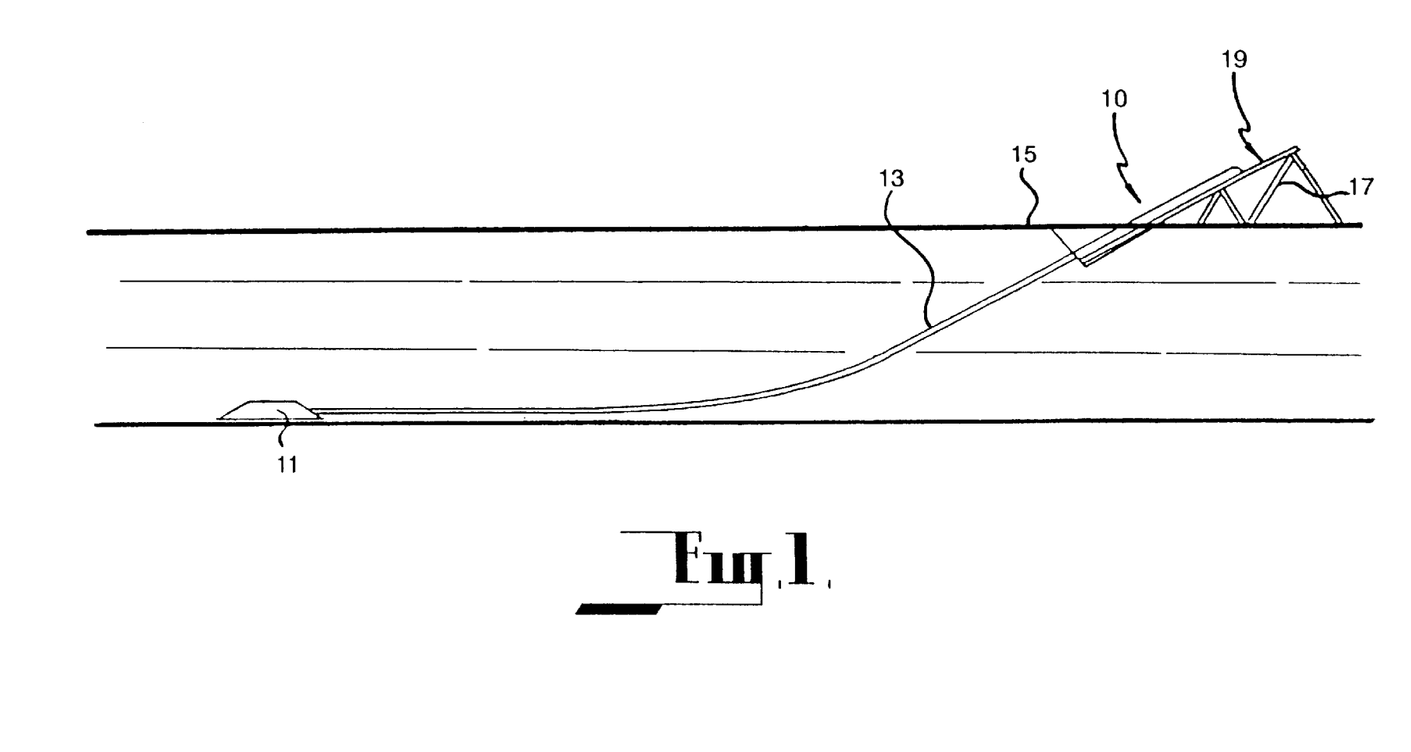
FIG. 1 is a schematic side view illustrating an underground mining operation utilising apparatus according to the embodiment.

One proposal for accessing the underground formations involves a mining apparatus 10 of the type generally shown in FIG. 1 of the drawings comprising a mining head 11 provided at one end of a pipe string 13. The mining head 11 is delivered to the underground formation where the mining operation is performed. The mining head 11 progressively excavates material from the underground formation and conveys the excavated material to the ground surface 15 by way of the pipe string 13. The pipe string 13 and head 11 may be manipulated to manoeuvre the mining head 11 within the underground formation. The head 11 providing the whole or part of the motive power. The path of the mining head provides an access passage 16, shown in FIG. 3, along which the pipe string 13 extends during the mining operation. The pipe string 13 extends from a structure 17 provided at a station 19 situated at ground level. The structure 17 may be erected on the ground or in a launch pit or recess within the ground.

The pipe string 13 comprises a plurality of pipe string sections which are connected one to another at the station 19 as the mining head 11 and pipe string 13 advance through the ground. Similarly, the pipe string sections are progressively dismantled at the station 19 when the pipe string 13 and mining head 11 are being retrieved from the ground.

Figure 2:
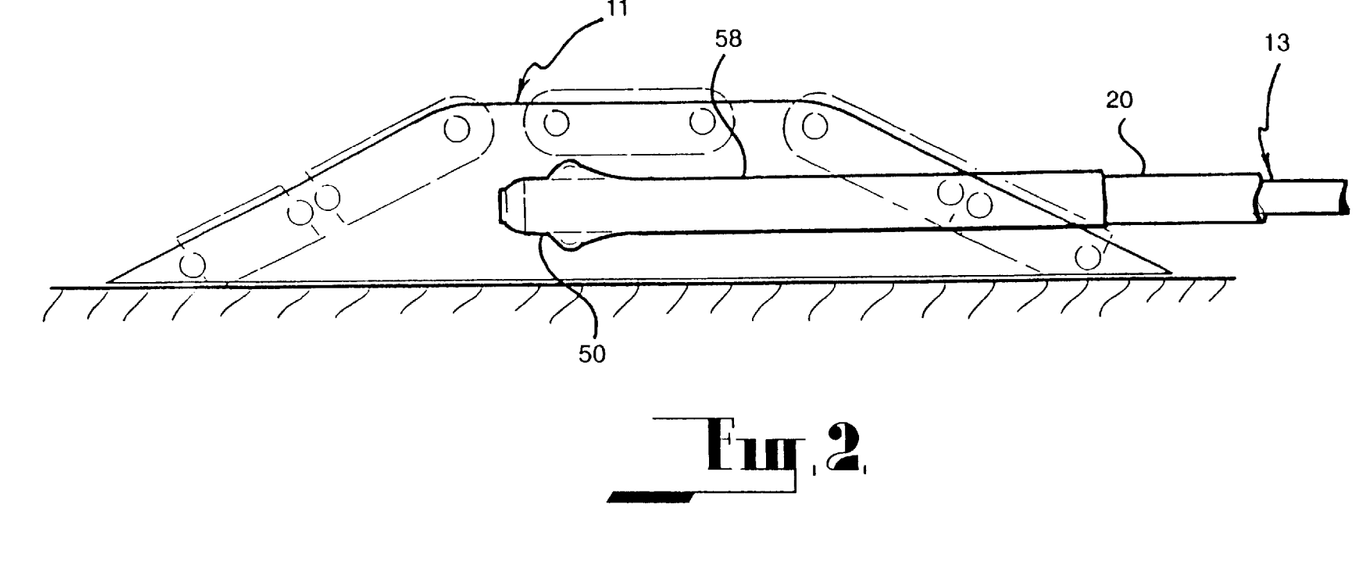
FIG. 2 is a schematic view illustrating the head end section of the apparatus according to the embodiment and a mining head associated therewith.

The mining head 11 is delivered to the underground formation by progressively excavating material to create a path for itself and the pipe string 13 trailing behind it, as shown in FIG. 2. The difficulty with this arrangement is that the passage 16 excavated by the mining head 11 can collapse about the pipe string 13, particularly in circumstances where the surrounding material 14 is unstable, such as in soft sandy conditions.

The present embodiment provides a casing or shroud 20 about the pipe string 13 for lining the passage 16 so as to prevent the surrounding material 14 from collapsing onto the pipe string 13.

The shroud 20 is formed from flexible material delivered in two sections 21, 22 and then assembled to form the shroud around the pipe string 13. Each section 21, 22 of flexible material is stored in roll form at station 19 on the ground and is unwound from the roll as the pipe string 13 advances.

Figure 4:
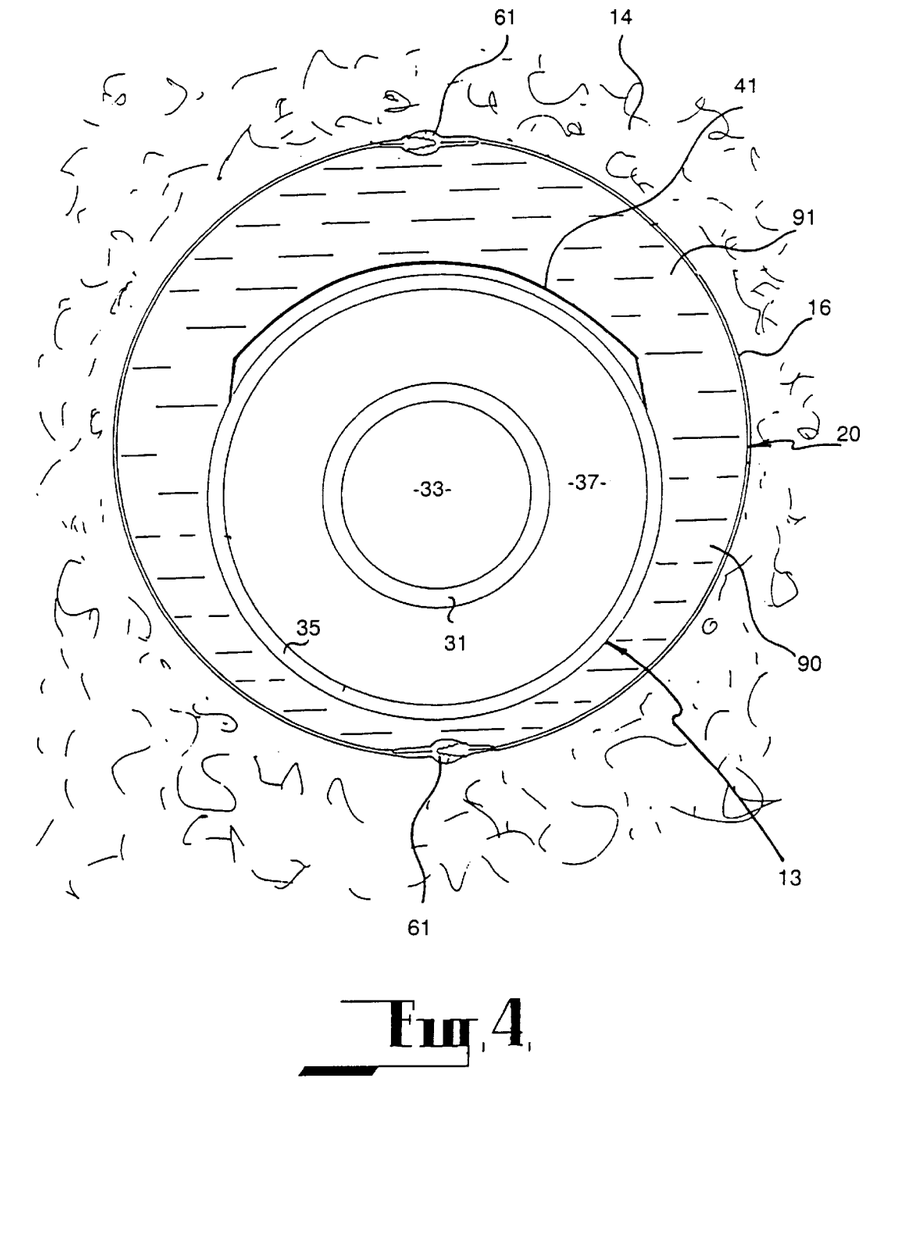
FIG. 4 is a cross-sectional view of part of the apparatus.
Figure 5:
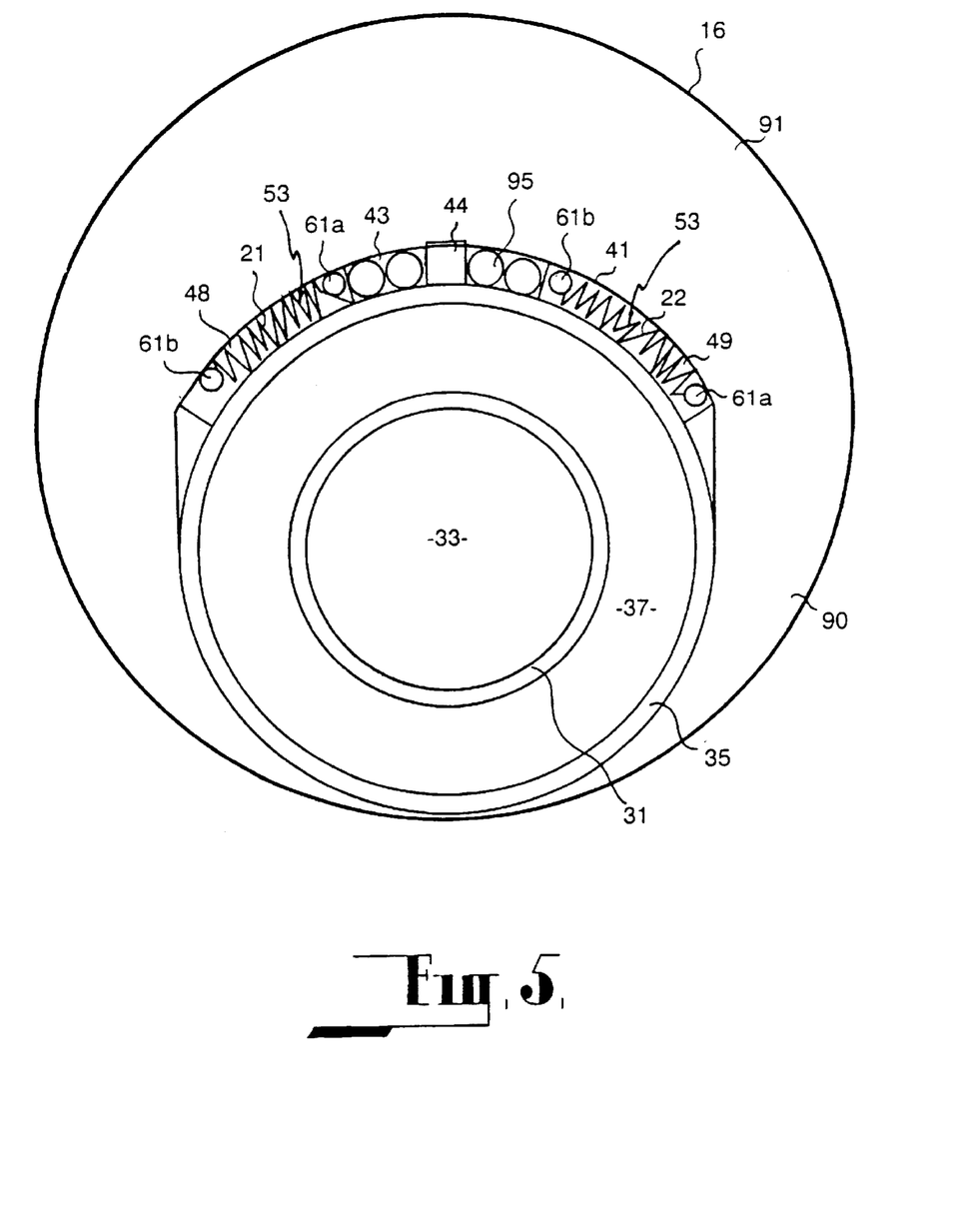
FIG. 5 is a cross-sectional view similar to FIG. 4 but showing further detail.

The pipe string 13 comprises an inner tube 31, seen in FIGS. 4 and 5, defining a central flow path 33 and an outer tube 35 positioned around, and in spaced apart relation to, the inner tube 31 such that an outer flow path 37 is defined between the inner tube 31 and the outer tube 35. The inner flow path 33 is provided to convey excavated slurry from the mining head 11 to the ground surface. The outer flow path 37 is provided to convey water under pressure from the ground surface to the mining head 11 for use in the mining operation.

The pipe string 13 further comprises a casing 41 mounted on the exterior of the outer tube 36, as is best seen in FIG. 5. The casing 41 provides a longitudinal space 43 which extends along the pipe string for accommodating service lines (such as power and telemetry cabling) which extend between the station 19 at ground surface and the mining head 11. The space 43 may also incorporate sensing means 44 to measure distance between the pipe string 13 and the shroud 20 to provide a warning of any impending collapse at the shroud.

The space 43 also incorporates two longitudinal passages 48, 49 along which the sections 21, 22 of flexible material can be conveyed in a compact condition from the station 19 to the head end section 50 of the apparatus.

Figure 6:
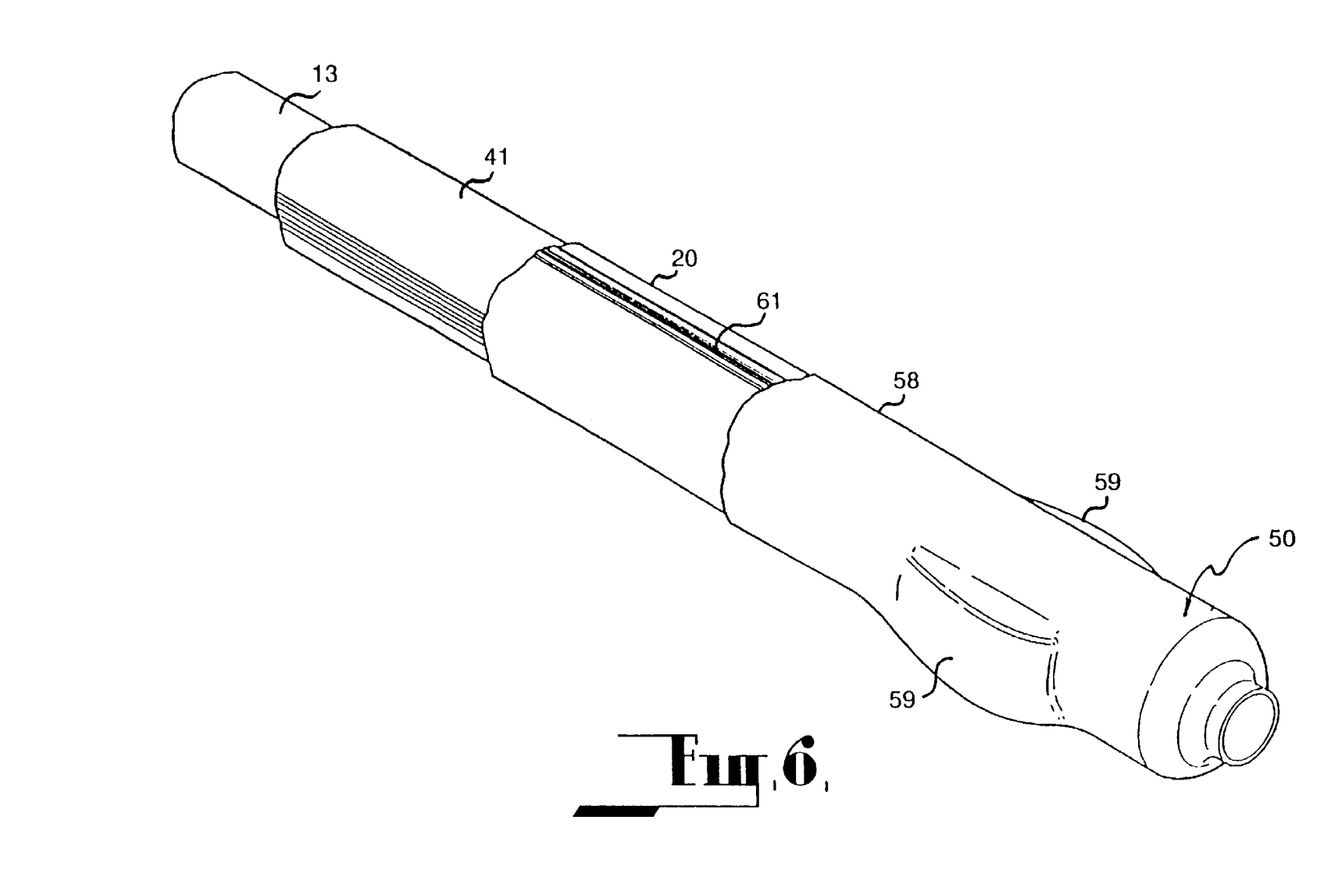
FIG. 6 is a fragmentary schematic view of the head end section of the apparatus.
Figure 7:
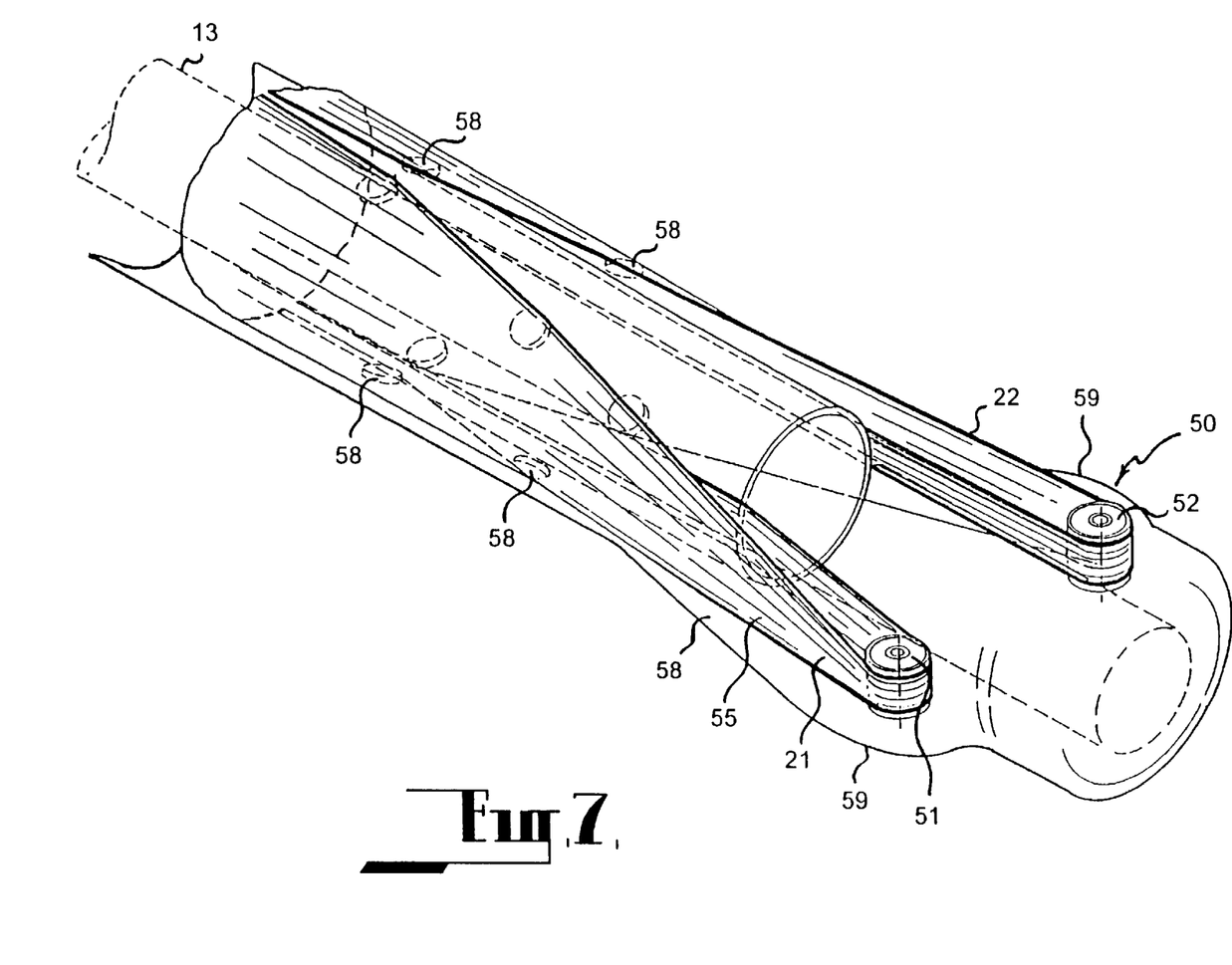
FIG. 7 is a schematic view of the head end section of the apparatus showing deployment of the shroud.
Figure 8:
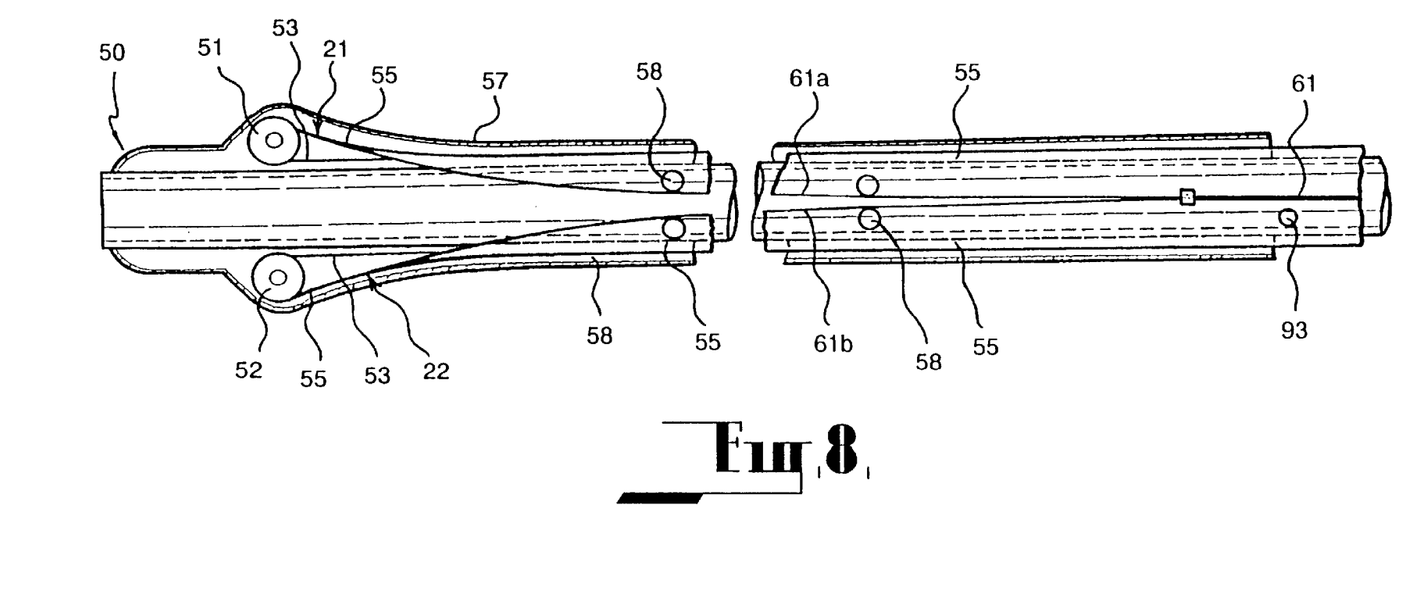
FIG. 8 is a fragmentary schematic cross-sectional view of the head end section.

At the head end section 50 of the apparatus, shown in FIGS. 6 to 8, there are provided two rollers 51, 52 one corresponding to each section 21, 22 of the flexible material. The rollers 51, 52 are so positioned that the flexible material which is drawn along the longitudinal passages 48, 49 in a compact condition each turns about itself on the respective roller to provide an inner section 53 and an outer section 55. The outer sections 55 emerging from the longitudinal passages 48, 49 spread from the compact condition and are subsequently brought together in a manner to be described later to form the shroud 20.

The rollers 51, 52 are accommodated in a casing 57 which surrounds the head end section 50. The casing 57 is in spaced apart relationship with the pipe string 13 whereby an annular space 58 is defined therebetween. The casing 57 incorporates protuberances 59 to accommodate the rollers 51 and 52, as best seen in FIG. 8 of the drawings.

The space 58 provides a path along which the outer section 55 of each section 21, 22 of the flexible material can be deployed with the longitudinal sides of the sections brought together to form the shroud 20.

Each flexible section 21, 22 has two longitudinal sides provided with a connector means 61, comprising a first connector element being a male element 61a and a second connector element being a female connector element 61b. The arrangement is such that the male connector element 61a of each flexible section is arranged for hermetic engagement with the female connector element 61b of the other flexible section in the manner of a zipper. In this way, the longitudinal sides of the two flexible sections 21, 22 can be zipped together to form the shroud, as best seen in FIG. 4. The longitudinal sections of the two sections 21, 22 are progressively brought towards each other and then subsequently zipped together by way of guide roller assemblies 58 positioned along the casing 57.

Figure 9:
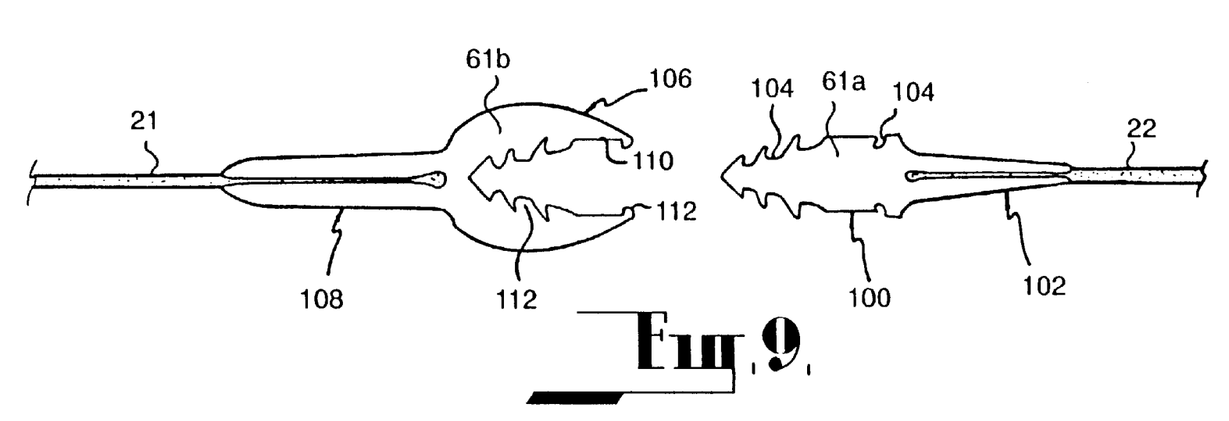
FIG. 9 is a schematic view illustrating connection means employed for forming the shroud, the connection means being shown in a separated condition.
Figure 10:
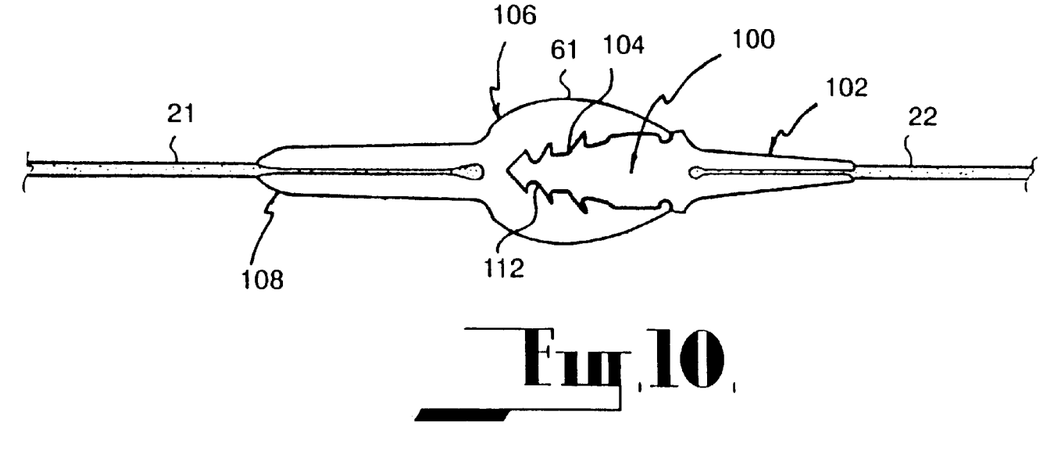
FIG. 10 is a view similar to FIG. 9 with the exception that the connection means are shown in a connected position.

The male connector element 61a comprises a head portion 100 and a trail portion 102. The trail portion 102 is affixed to the longitudinal side of the flexible section 22. The head portion 100 has provided thereon a series of recesses 104. The female connector element 61b comprises a channel portion 106 and a tail portion 108. The tail portion 108 is affixed to the longitudinal side of the flexible section 21. The channel portion 106 has provided on an inner surface 110 thereof a series of ridges 112 complimentary to the recesses 104 of the male connector element 61a. Upon zipping together of the connector elements 61a and 61b the head portion 100 is received within the channel portion 106.

The ridges 112 and recesses 104 engage in a manner such that a force applied to pull the connector elements 61a and 61b apart causes the channel portion 106 to grip the head portion 100 with greater force by accentuating positive engagement of the ridges 112 and recesses 104.

It is envisaged that means be provided to ensure that the connector means 61 is firmly fastened before it is released from the head 11. These means can cover electrical, magnetic and visual means for checking before release.

A lower seal (not shown) is provided between the outer periphery of the pipe string 13 and the inner periphery of the shroud 20 at a location adjacent the region in the head section 50 at which assembly of the two sections 21, 22 is completed to form the shroud. The inner seal can be a complex of inflating and flexible seals which in turn can be used to pressure test the shroud 20 and connector means 61 before release from the elongate element. The lower seal is fixed in relation to the pipe string 13 so as to advance and withdraw with the pipe string, and slidingly engages the outer section 55.

Figure 3:
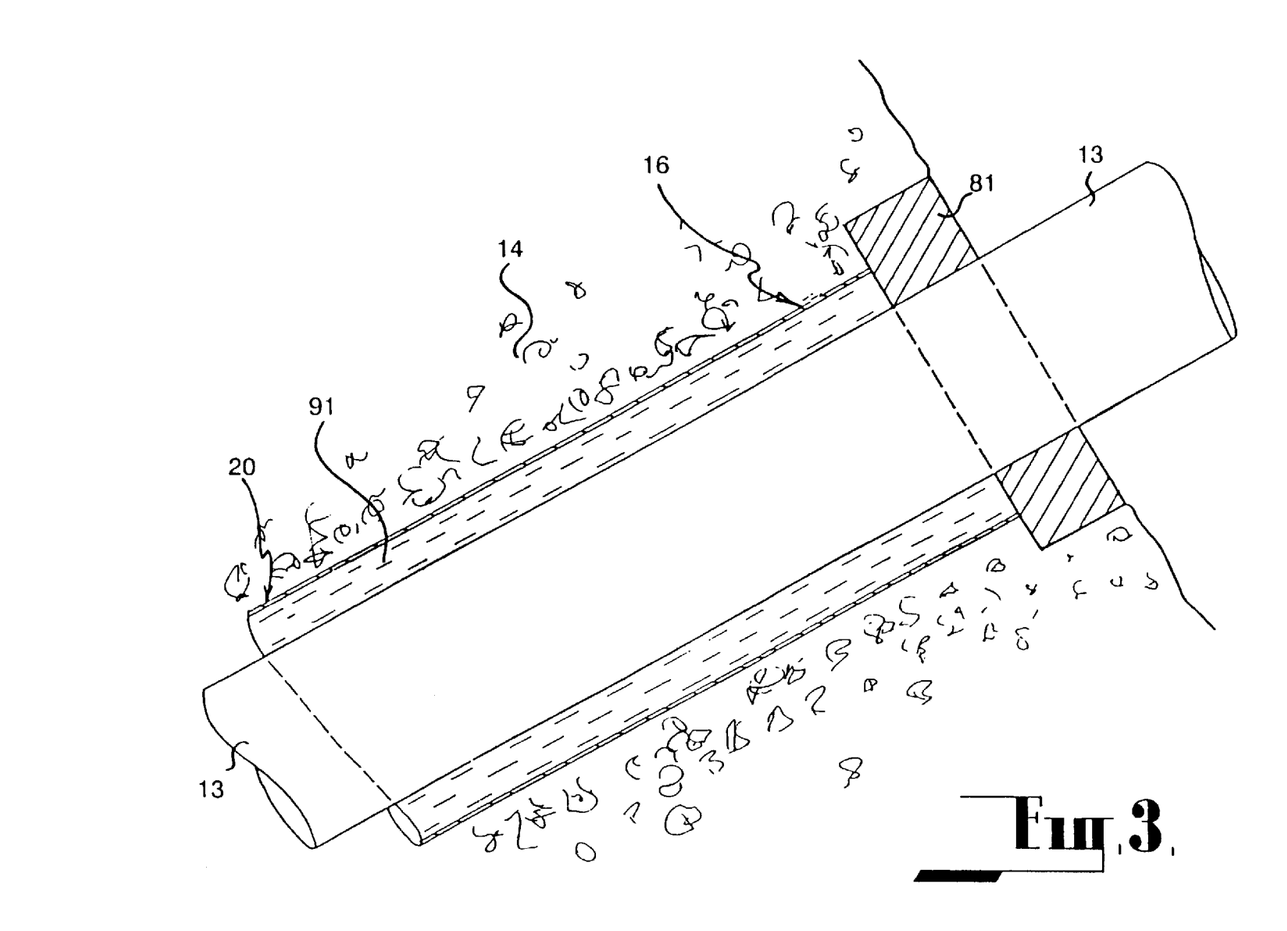
FIG. 3 is a schematic view of a tail end section of the apparatus.

Similarly, an upper seal 81 is provided adjacent ground level or at the water table between the shroud 20 and the pipe string 13, as shown in FIG. 3. The upper seal 81 is arranged to permit sliding movement of the pipe string therethrough as it advances along the passage 16.

The inner and upper seals define a sealed zone 90 within the shroud 20 which provides an inflation chamber 91, seen best in FIGS. 4 and 5. An inflation fluid such as Betonite slurry is introduced into the inflation chamber 91 for the purposes of inflating the shroud 20 and urging it into engagement against the periphery of the passage 16 around the pipe string 13. In this way, the shroud 20 provides support for the material 14 adjacent the periphery of the passage 16 for the purposes of preventing collapsing of the passage around the pipe string. The inflation fluid is introduced into the inflation chamber through inlet port 93 which communicates with a delivery line 95 accommodated within the casing 41 on the pipe string 13. The delivery line 95 extends to the station 19 at ground level to receive the inflation fluid.

In operation, the apparatus according to the embodiment progressively deploys the shield 20 which supports the passage 16 formed by the mining head 11 as it advances through the ground. The shroud 20 is continually deployed as the pipe string 13 advances, the sections 21, 22 of flexible material being drawn along the longitudinal passages 48 in the casing 41 on the pipe string, and then being turned about themselves on the rollers 51, 52 and subsequently brought together to form the shroud in the manner described. With this arrangement, the shroud 20 is progressively deployed at the head end section 50, the outer section 51 of the shroud being stationary with respect to the passage 16 once it has been deployed to form the shroud.

At the completion of the mining operation, the pipe string 13 and mining head 11 can be retracted along the passage 16. During retraction of the pipe string and mining head, the sections 21, 22 of flexible material are also retracted and returned to the rolls on which they are stored. During the retraction process, the connecting elements 61 unzip with respect to each other and the sections 21, 22 are drawn into and along the longitudinal passages 48 within the casing 41.

A cleaning means (not shown) may be provided for performing a cleaning operation on the sections 21, 22 of flexible material before they are returned to the roll form. The cleaning means may comprise sprays from which a cleaning fluid such as water is sprayed onto the sections.

Figure 11:
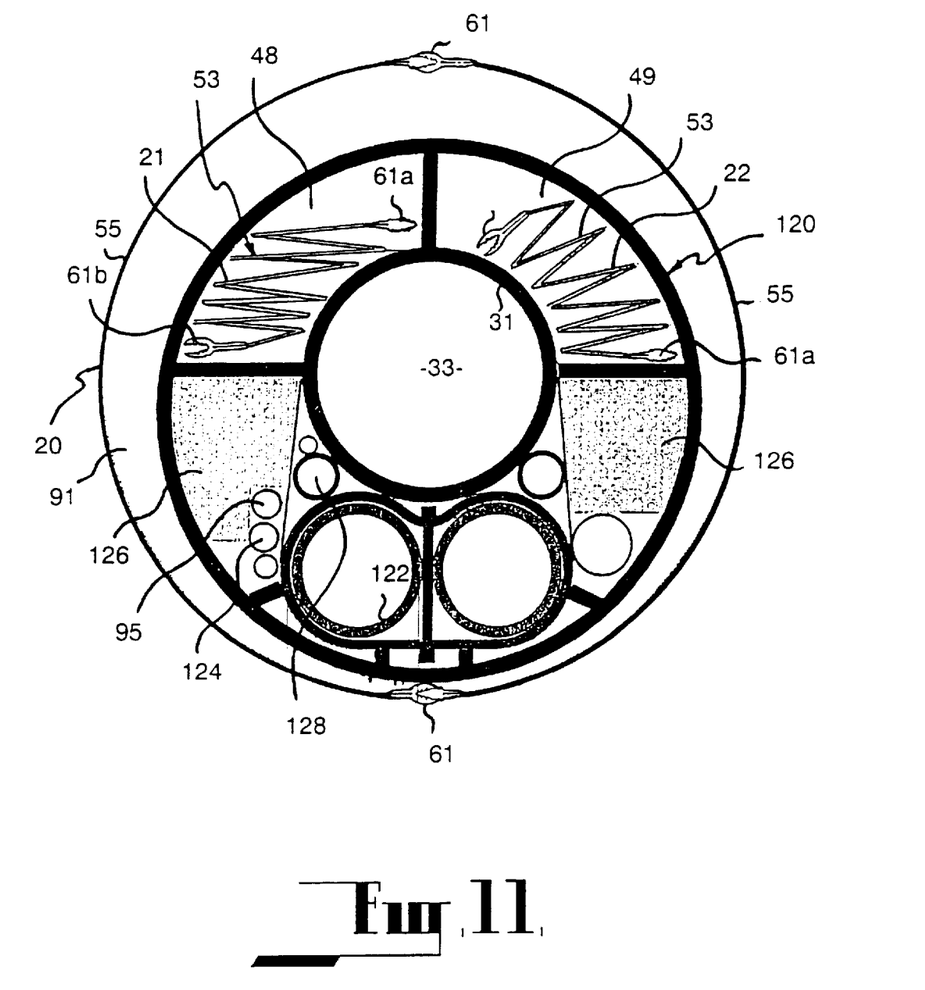
FIG. 11 is a cross-sectional view of a pipe string and longitudinal sections of an apparatus in accordance with a second embodiment of the present invention within a deployed outer section of flexible material.

In FIG. 11 there is shown a second embodiment of the apparatus of the present invention. The embodiment is substantially similar to that of FIGS. 1 to 10 and like numerals denote like parts. The second embodiment comprises a pipe string 120 substantially circular in cross-section in which is provided the inner tube 31 defining the central flow path 33.

The pipe string 120 further carries two water lines 122 replacing the outer tube 35 of the first embodiment and the variously required service lines for power and telemetry cabling, shown generally at 124. Still further, flotation or buoyancy material 126 may be provided therein so as to buoy the pipe string 120 within the inflation chamber 91.

The longitudinal passages 48, 49 are provided within the pipe string 120 and such may also have the sections 21, 22 of flexible material conveyed therethrough in a compact condition. The operation of the second embodiment is substantially the same as that of the first embodiment. A delivery line 128 for cleaning water is shown within the pipe string 120, the cleaning water being utilised to clean the sections 21, 22 of the flexible material before they are returned to the roll form.

Figure 12:
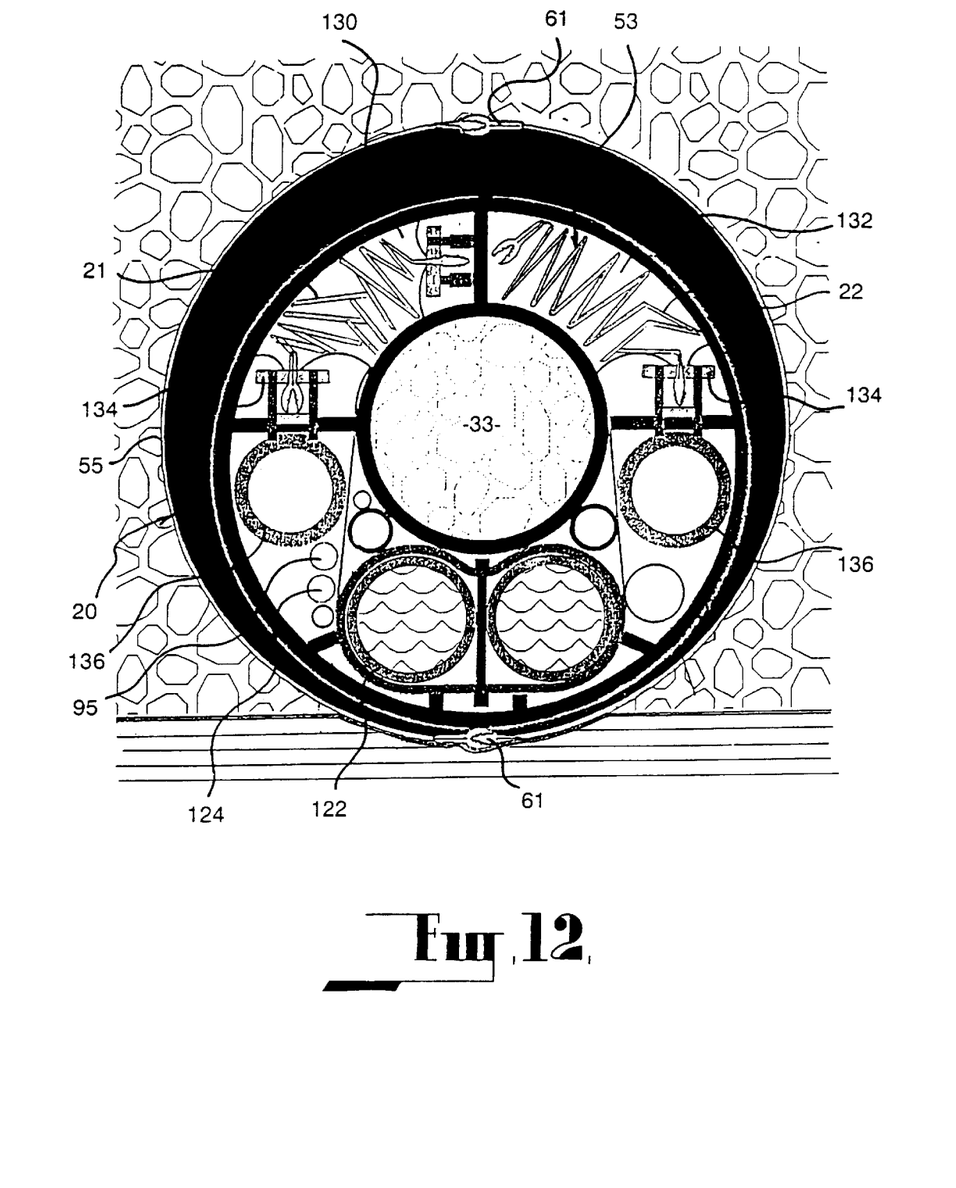
FIG. 12 is a view similar to that of FIG. 11 with the exception that driving means are provided in the longitudinal passages to facilitate deployment of the flexible material.

In FIG. 12 there is shown a modification of the pipe string 120 in which longitudinal passages 130, 132 have the sections 21, 22 of flexible material provided with driving means comprising conveyor roller pairs 134 and power means 136 associated therewith. The roller pairs 134 receive therein the connector elements 61a or 61b and facilitate the travel of the inner section 53 of the flexible material within the passages 130, 132. Such is advantageous when the flexible material is to be conveyed within the pipe string 120 over long distances.

From the foregoing it is evident that the embodiment provides a system for supporting the passage 16 to allow the pipe string 13 to move freely therealong without being jammed by collapsible material.

It is envisaged that the connector means for joining the longitudinal sides of the flexible sections 21, 22 may alternatively be replaced by a means for achieving either the stitching, welding or bonding together of the longitudinal sides.

It is still envisaged that the present invention will provide advantages in relation to both petroleum exploration and the re-lining of pipe-lines. With regard to the former the present invention should relieve the necessity for multiple sized drill casings and allow use in environments prone to collapse. The reverse telescoping nature of the casings presently used in these applications is prone to jamming in such environments.

The relining of piping presently often involves depositing a fresh surface within an inner surface of the pipe from which an old surface has been removed. Use of the present invention will allow a low friction surface to be deployed within the pipe. Preferably such would be comprised of polyethylene or similar material.

The shroud of the present invention may be deployed with an adhesive and possibly a filler material on the surface exposed to the inner surface of the pipe to facilitate placement.

A still further embodiment of the present invention may allow a soft flexible material to be deployed as the shroud, the material being such that once it is in position, it will harden independently or can, upon exposure to a suitable catalyst, cure or set such that the shroud becomes inflexible or rigid.

It is further envisaged that the apparatus and method of the present invention may be used in applications aimed only at tunnelling. For example, two substantially concentric shrouds may be deployed and between which a settable material can be injected, for example concrete. The concrete sets for form a pipe in situ. The innermost of the shrouds deployed in this manner may or may not be reclaimed. If left in situ the innermost shroud would actively prevent penetration of materials through the settable material and into the void of the pipe being created.

What is claimed is:

1. An apparatus adapted for movement through a passage formed in the ground, comprising:

an elongate element having an inner channel and an outer channel, the inner channel being a region internal to an inner longitudinal periphery and the outer channel being a region between the inner longitudinal periphery and an external longitudinal periphery of the elongate element;

a shroud;

means for positioning the shroud around at least part of the external longitudinal periphery of the elongate element for supporting engagement with the periphery of the passage to provide a space through which the elongate element can move, the shroud being of flexible construction and being arranged to be progressively installed in position as the elongate element moves along the passage; and means for introducing an inflation fluid into a region between the shroud and the external longitudinal periphery of the elongate element for inflating the shroud and maintaining it in supporting engagement with the periphery of the passage, wherein the shroud is delivered to the elongate element from a remote storage point for installation.

2. An apparatus according to claim 1, characterised in that the shroud is assembled from flexible material which turns around a location on the elongate element to provide an inner section which is conveyed with the elongate element and an outer section which is turned back with respect to the inner section and which provides the shroud.

3. An apparatus according to claim 2, characterised in that the outer section of the shroud is fixed in relation to the passage whereby the flexible material turns around from the inner section to the outer section to provide the shroud as the elongate element moves along the passage.

4. An apparatus according to claim 2, characterised in that the flexible material comprises two or more elongate sections arranged such that the longitudinal sides thereof are joined one to another at the outer section to provide the shroud.

5. An apparatus according to claim 4, characterised in that the longitudinal sections have complimentary connector elements on their longitudinal sides for joining the longitudinal edges thereof together.

6. An apparatus according to claim 5, characterised in that the flexible material is turned around from the inner section to the outer section at turning means.

7. An apparatus according to claim 6, characterised in that the turning means comprises rollers moving with the elongate element and mounted thereon.

8. An apparatus according to claim 7, characterised in that the rollers are accommodated within a protective casing positioned about a leading end of the elongate element.

9. An apparatus according to claim 8, characterised by the inner section of the flexible material being accommodated in one or more longitudinal passages provided in or on the other periphery of the elongate element.

10. An apparatus adapted for movement through a passage defined by a peripheral wall, comprising:

(a) an elongate element;

(b) a shroud;

(c) means for positioning the shroud around at least part of an external periphery of the elongate element to provide a space through which the elongate element can move, the shroud being of flexible construction and being arranged to be progressively installed in position as the elongate element moves along the passage; and (d) means for introducing an inflation fluid into a region between the shroud and the external longitudinal periphery of the elongate element for inflating the shroud and maintaining it in supporting engagement with the peripheral wall of the passage, wherein, the shroud is assembled from flexible material which turns around a location on the elongate element to provide an inner section which is conveyed with the elongate element and an outer section which is turned back with respect to the inner section and which provides the shroud.

* * * * *